J. D. KNEEDLER.
ENGINE.
APPLICATION FILED FEB. 18, 1913.
1,077,724.
Patented Nov. 4, 1913.
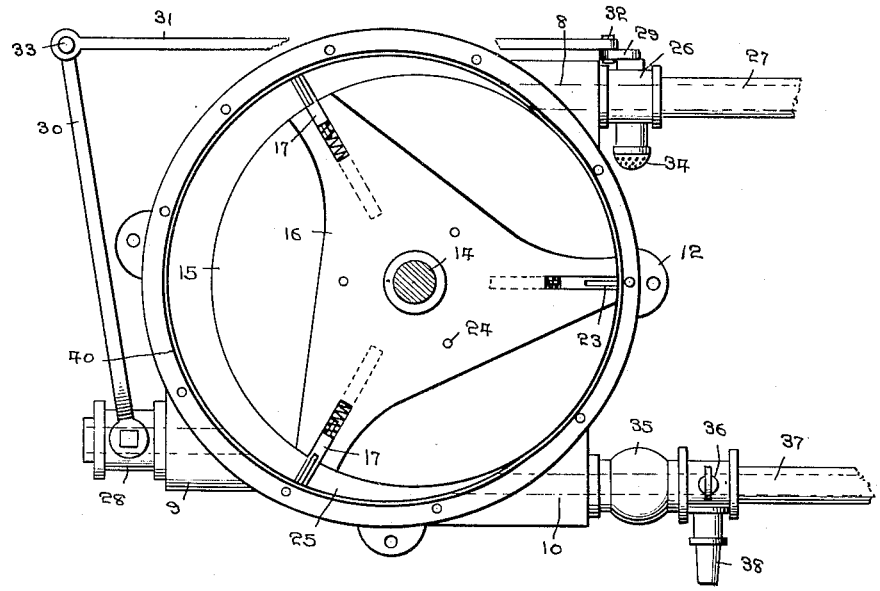
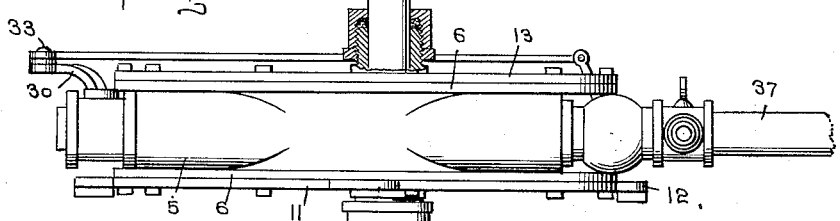
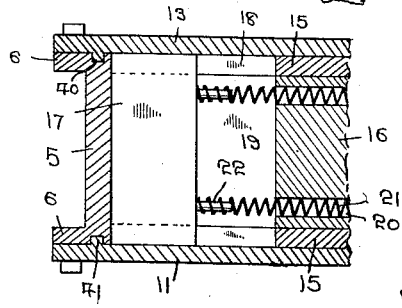
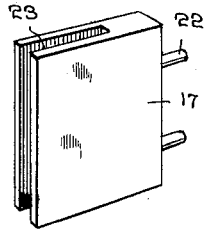
Witnesses
Inventor
J. D. Kneedler
By W. J. FitzGerald
Attorney

UNITED STATES PATENT OFFICE.

JOHN D. KNEEDLER, OF SIOUX CITY, IOWA.

ENGINE.

1,077,724.　　　　Specification of Letters Patent.　　Patented Nov. 4, 1913.

Application filed February 18, 1913. Serial No. 749,226.

*To all whom it may concern:*

Be it known that I, JOHN D. KNEEDLER, a citizen of the United States, residing at Sioux City, Iowa, in the county of Woodbury and State of Iowa, have invented certain new and useful Improvements in Engines; and I do hereby declare the following to be a full, clear, and exact description of the invention, such as will enable others skilled in the art to which it appertains to make and use the same.

This invention relates to motors, and it more particularly relates to a combined rotary motor and fluid compressor.

An object of the invention is to provide an improved machine of this character which is adapted for compressing air or other fluid and storing it and subsequently utilizing it as a motive power.

Another object of the invention is to provide a machine of this character which is especially applicable in connection with the transmission mechanisms described in my pending applications, 680,708, 692,085 and 720,884.

Another object of the invention is to provide a machine of this character which is adapted to be applied to automobiles, motorcycles, aeroplanes, or any kind of conveyance or machinery for conserving the power which would otherwise be lost, and subsequently utilizing said power, and, a still further object of the invention is to provide a machine of this character which may be quickly and easily converted from a motor to a compressor and vice versa.

Other objects and advantages may be recited hereinafter and in the claims.

In the accompanying drawings which supplement this specification, Figure 1 is a top plan view of the machine having its cover and one of its rotor disks removed and having parts broken away; Fig. 2 is a side elevation view partly in section; Fig. 3 is an enlarged detail sectional view, and, Fig. 4 is an enlarged perspective view of one of the rotor blades.

Referring to these drawings in which similar reference characters correspond with similar parts throughout the several views, the rotor casing consists of a cylindrical body 5 having peripheral flanges 6 and bosses 8, 9 and 10 formed thereon. The casing also comprises a base-plate or disk 11 having supporting lugs 12 formed thereon and being secured to one of the flanges 6, while a somewhat similar plate or disk 13 is secured to the other flange 6. These disks 11 and 13 are fitted air-tightly and are provided with bearings in which are journaled a shaft 14. Upon this shaft is mounted a rotor which consists of a pair of rotor disks 15, a rotor head 16 and rotor blades 17.

While the casing is approximately perfectly cylindrical, it is not entirely so, but a portion thereof is curved around a shorter radial line than the remaining portion thereof, and the shorter radial line is equal in length to the radii of the disks 15, so that the peripheries of said disks fit snugly within an arc of the casing of approximately 110°, although the extent of this arc may be varied to any desired extent. The disks 15 are provided with radial slots 18 while the rotor head 16 is provided with radial slots 19 which register with the opposite slots 18. Within the registering slots 18 and 19 are mounted the rotor blades 17, having their ends fitted snugly against the respective inner walls of the disks 11 and 13, and having their opposite planes fitted snugly within said registering slots, but being sufficiently loose therein to allow free radial movement thereof. The head 16 is provided with radial spring seats or apertures 20 which communicate with the respective slots 19, and in these apertures 20 are springs 21 which extend into contact with the heads 17, and said heads are preferably provided with pins or studs 22 which engage with the springs 21 for retaining them in proper relation to the blades. These springs serve to hold the blades 17 outward against the cylindrical wall 5. I provide each of the blades 17 with a slot 23 which extends throughout its length and bifurcates its operative edge or side, so as to form a seat for carrying any suitable kind of packing to prevent the passage of fluid between the blade and the walls of the casing. Any suitable means, as indicated at 24, may be employed for securing the rotor disks to the rotor head, so as to retain the slots 18 and 19 in perfect registry, and thereby prevent them from binding upon the rotor blades.

A glance at Fig. 1 will show that the shaft 14 and the rotor carried thereby are mounted eccentrically to the major portion of the casing, being concentric with the minor portion thereof, as previously described, and so, the rotor blades are entirely inclosed by the slots 18 and 19 at intervals while at other intervals they extend radially beyond the rotor elements into the compression chamber 25 which lies between the outer periphery of the rotor head and disks and the inner wall of the casing.

The hollow cylindrical boss 8 is fitted with a valve member 26 and this valve member and boss constitute an inlet port, which may communicate with any suitable source of fluid supply (not shown), through the medium of a pipe 27. The boss 9 is fitted with a valve member 28 which constitutes an outlet or an exhaust port when the machine is employed as a motor. The valve members 26 and 28 are connected together by means of levers 29 and 30 which are connected together by means of a link 31, said link being pivoted at 32 and 33 to the levers 29 and 30 respectively. Any suitable supporting means (not shown) may be employed for moving the link 31 longitudinally, so as to swing the levers 29 and 30 and thereby actuate the valve members 26 and 28 simultaneously. The valve member 26 is provided with a suction inlet 34, and this valve member may be of any ordinary three-way construction so that when the lever 29 is actuated the fluid may be alternately admitted through the pipe 27 and through the inlet 34.

Fitted onto the boss 10 is a check valve 35 which may be of any usual or preferred construction for allowing the exit of fluid from the casing, but preventing the return thereof. I may also provide a three-way valve 36, communicating with the check valve 35 and with an exit pipe 37 which is adapted to connect with the storage tank, with which the pipe 27 is connected, or with any preferred storage tank (not shown). A nipple 38 also communicates with the valve 36, so that an automobile tire may be connected therewith by means of tubing (not shown), for inflating the tire by means of the compressor.

In operation as a compressor, the link 31 is shifted, so as to close the pipe 27 and the valve member 28 and at the same time to open the suction inlet 34, whereupon the shaft 14 is rotated, so as to carry the rotor blades past the inlet opening, and thus create a suction which draws the air through the inlet 34 into the casing and carries it through the compression chamber into the valve 35, through which it passes into and through the outlet pipe 37, and is compressed within the tank or reservoir and thereby reserved for use as a motive power. When used as a motor, the link 31 is shifted in the opposite direction from that in which it was shifted when the machine was employed as a compressor; so that the inlet 34 is closed and the inlet 27 and exhaust valve 28 are opened, whereupon the compressed air rushes through the inlet valve member 26 into the casing and strikes against the rotor blades 17, thereby causing the blades to carry the rotor around, in an obvious manner. It will be seen, therefore, that the shaft 14 is caused to rotate with the rotor, so as to carry any machinery that is operatively connected with the shaft. I preferably form the shaft in two sections, connected by any suitable means, so that the sections may be disconnected when it is desired to remove the motor for repairs.

It is obvious that any suitable means may be employed for rendering the casing airtight, but I preferably provide the cylindrical portion 5 with grooves 40, and I provide the disks 11 and 13 with tenons 41 which fit snugly within the grooves 40 as illustrated in Fig. 3.

It will be seen that I have provided a machine of this character which is fully capable of attaining the foregoing objects, in a thoroughly practical and efficient manner.

I do not limit my invention to the exact details of construction, combination and arrangement of parts, as herewith illustrated and described, but my invention may only be limited by a reasonable interpretation of the claims.

I claim:

1. In a combined compressor and motor, the combination of a casing having an inlet and outlet adapted to communicate with a storage tank through said inlet and outlet, said casing being also provided with an exhaust outlet, a rotor in the casing, a check valve in the first said outlet, a suction inlet communicating with the first said inlet, a three-way valve at the junction of the first said inlet and the suction inlet, a valve for controlling the exhaust outlet, and means for simultaneously actuating the last said valve and said three-way valve, so as to transform the combination into a motor or a compressor alternately.

2. In a machine of the character described, the combination of a casing having an inlet and outlet, and an inlet port, a three-way valve associated with the inlet, said inlet comprising means through which air may be sucked in and means through which air may be forced into the casing alternately through the three-way valve, and a rotor in the casing adapted to be operated for sucking air into the casing and to alternately coöperate with the inlet and the casing so as to constitute a motor.

3. In a machine of the character described, the combination of a casing having an inlet and exhaust, a three-way valve associated with the inlet, said inlet comprising means through which air may be sucked in, and means through which air may be forced into the casing alternately through the three-way valve, a rotor in the casing adapted to be operated for sucking air into the casing and to alternately coöperate with the inlet and the casing so as to constitute a motor, and means for simultaneously contrōlling said inlet and exhaust.

4. In a machine of the character described, the combination of a casing having an inlet, a rotor in the casing, an exhaust outlet and an outlet, three-way valves in said inlet and outlet, and a valve in said exhaust outlet.

5. In a machine of the character described, the combination of a casing having an inlet and a plurality of outlets, a rotor in the casing, a three-way valve in said inlet, a three-way valve in one of said outlets, a check valve also in said last mentioned outlet, and a valve in another of the outlets.

6. In a machine of the character described, the combination of a casing having an inlet and a plurality of outlets, a rotor in the casing, three-way valves in the inlet and in one of the outlets, a check valve in said last mentioned outlet, a valve in another of the outlets, and means for simultaneously controlling the valves in the last mentioned outlet and in the inlet.

In testimony whereof I have signed my name to this specification in the presence of two subscribing witnesses.

JOHN D. KNEEDLER.

Witnesses:
K. SLOTSKY,
B. I. STEWART.